(12) United States Patent
Gat et al.

(10) Patent No.: US 8,466,964 B2
(45) Date of Patent: Jun. 18, 2013

(54) MULTISPECTRAL UNCOOLED THERMAL INFRARED CAMERA SYSTEM

(75) Inventors: Nahum Gat, Manhattan Beach, CA (US); Jason Kriesel, Long Beach, CA (US)

(73) Assignee: Opto-Knowledge Systems, Inc., Torrance, CA (US)

( * ) Notice: Subject to any disclaimer, the term of this patent is extended or adjusted under 35 U.S.C. 154(b) by 1238 days.

(21) Appl. No.: 12/060,881

(22) Filed: Apr. 2, 2008

(65) Prior Publication Data
US 2011/0169962 A1  Jul. 14, 2011

Related U.S. Application Data

(60) Provisional application No. 60/921,527, filed on Apr. 2, 2007.

(51) Int. Cl.
*H04N 5/33* (2006.01)
(52) U.S. Cl.
USPC .......................................................... 348/164
(58) Field of Classification Search
USPC .... 348/164; 250/330, 338.1, 339.11; 374/124
See application file for complete search history.

(56) References Cited

U.S. PATENT DOCUMENTS

| | | | |
|---|---|---|---|
| 4,011,452 A | 3/1977 | Meyers | |
| 4,725,733 A | 2/1988 | Horman | |
| 5,444,236 A | 8/1995 | Ludington | |
| H1599 H | 10/1996 | Task | |
| 5,822,222 A | 10/1998 | Kaplinsky | |
| 6,023,061 A | 2/2000 | Bodkin | |
| 6,121,616 A * | 9/2000 | Trigg | 250/339.07 |
| 6,292,212 B1 | 9/2001 | Zigadlo | |
| 6,355,939 B1 | 3/2002 | Dodd | |
| 6,357,910 B1 | 3/2002 | Chen | |
| 6,515,285 B1 | 2/2003 | Marshall | |
| 6,758,595 B2 | 7/2004 | Seitz | |
| 6,853,452 B1 | 2/2005 | Laufer | |
| 2003/0213897 A1 * | 11/2003 | Pieri et al. | 250/252.1 |
| 2004/0223069 A1 | 11/2004 | Schoonmaker | |
| 2006/0091310 A1 * | 5/2006 | Furry | 250/330 |
| 2007/0120058 A1 | 5/2007 | Blackwell | |
| 2007/0176104 A1 | 8/2007 | Geneczko | |

* cited by examiner

*Primary Examiner* — Mehrdad Dastouri
*Assistant Examiner* — Kristin Dobbs
(74) *Attorney, Agent, or Firm* — Perkins Coie LLP (57) ABSTRACT

A multispectral thermal infrared camera system is disclosed. An uncooled thermal imaging camera is equipped with an axially tilted, cooled spectral filter. The axially tilted, cooled spectral filter deflects the radiation emitted by the uncooled camera away from being reflected back into the camera. The axially tilted, cooled spectral filter emits a lesser amount of thermal radiation towards the camera. And the axially tilted, cooled tilted filter is enclosed in a cold radiation shield to minimize the thermal emission that would be reflected by the filter towards the camera and to absorb the radiation deflected by the tilted filter. The axially tilted, cooled spectral filter passes only the desired portion of the thermal infrared radiation from the scene onto the uncooled camera.

15 Claims, 5 Drawing Sheets

MULTISPECTRAL UNCOOLED THERMAL INFRARED CAMERA SYSTEM

PRIORITY APPLICATION

This application claims priority to the U.S. provisional application Ser. No. 60/921,527 filed with the United States Patent and Trademark Office on Apr. 2, 2007, entitled "MULTISPECTRAL UNCOOLED THERMAL INFRARED CAMERA SYSTEM" by inventors Nahum Gat and Jason Kreisel, which is incorporated by reference herein in its entirety.

STATEMENT OF GOVERNMENT RIGHTS

This invention was made with U.S. Government support under Contract No. W15QKN-06-C-0211 awarded by the U.S. Department of the Defense. The U.S. Government has certain rights in this invention.

FIELD OF THE INVENTION

This invention relates to uncooled multi-spectral infrared camera systems, and, more particularly, to enhancing the quality of collected infra-red imagery at multiple spectrally selective states through the reduction of parasitic radiation. Parasitic radiation is defined here as radiation from all sources in the system and environment that is not related to the scene to be imaged.

BACKGROUND

In many applications it is desirable to capture imagery in one to several limited bands of Thermal Infrared Radiation (TIR) with cameras sensitive to the MidWave Infrared Region (MWIR) generally defined as encompassing wavelengths from 3 to 6 micrometers (μm) and/or the Long Wave Infrared (LWIR) generally defined as encompassing wavelengths from 7 to 14 μm. For example, instead of imaging over the full detector response of an LWIR camera one may wish to use a filter to limit the response to wavelengths between 8 to 9 μm or 10.5 to 11.5 μm, etc. Most commercial camera systems designed to collect multi-spectral imagery (i.e., images at two to several discrete wavelength bands) utilize cryogenically cooled quantum type detectors and, as a consequence, are expensive. Such systems use a cooled infrared focal plane array (IRFPA) and cooled individual optical band pass filters or multiple filters in a cooled filter wheel. Another class of TIR cameras exists that use uncooled detectors, such as microbolometer (or amorphous silicon and other types) cameras, which are also sensitive to the thermal infrared region of the spectrum, typically wavelengths from about 7 μm to 14 μm. These cameras are a low cost alternative to the expensive cooled detectors, and are very popular in industrial, law enforcement, security, military, and research applications. One reason the cost of the microbolometer camera is so low, relatively speaking, is that microbolometer sensors operate with little or no cooling as opposed to the cooled quantum type detectors mentioned previously, which require a good degree of cooling, often to 80K or below.

In many applications it is desirable to capture imagery in one to several limited slices of the radiant energy spectrum, for example 8 to 9 μm only, or 10.5 μm and above only, or 10.5 μm and below only, and the like. Band-pass, long-pass, short-pass, or notch filters are available from commercial sources for selectively slicing up the radiant energy spectrum in that way. Such filters are referred to as "spectrally selective."

However, using those commercial spectral filters with microbolometer cameras poses a challenge since the filters transmit only over a certain portion (e.g., the band-pass) of the spectrum, but reflect and/or emit radiation at all other regions of the spectrum. The relationship between reflection and transmission is described in this situation by Kirchoff's Law, which states that in thermal equilibrium $\tau+\rho+\alpha=1$ and $\alpha=\epsilon$. The terms in the foregoing equations represent transmission ($\tau$), reflection ($\rho$), absorption ($\alpha$), and emissivity ($\epsilon$), respectively. Typically spectral filters used in the thermal infrared have relatively low absorption coefficients, so the radiation that is not transmitted is primarily reflected. By the same token, in thermal equilibrium, the filter emits as much thermal radiation as it absorbs.

If a band-pass filter is placed in front of a microbolometer camera the image is degraded by parasitic background radiation from both the emission of the filter and the reflection off of the filter. With the filter placed at normal incidence, that is, perpendicular to the optical axis, the reflected radiation is from the warm detector, which in the case of a microbolometer is often significantly higher than room temperature. That effect is not a problem with the more expensive quantum-type cooled IRFPAs, since those detectors are maintained at a cold enough temperature to avoid emission of a significant level of radiation. In such cameras the filter is also cold. Thus neither reflected nor emitted radiation is present in cooled quantum-type FPAs.

Figure 1:
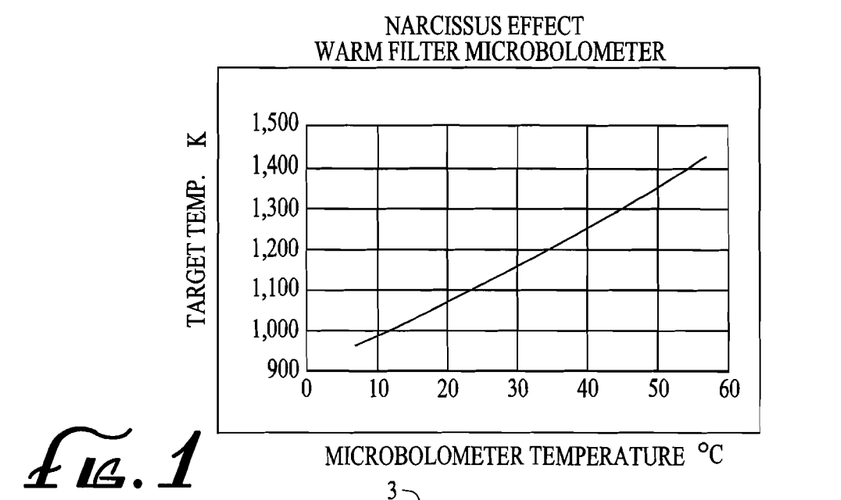
FIG. 1 is a graph representing the result in an uncooled infrared imaging camera of the prior art that contains a band-pass filter.

The graph FIG. 1, labeled Narcissus effect is an example of the result obtained from placing a band pass filter that passes wavelengths between 8 μm to 9 μm and reflects other wavelengths in front a microbolometer camera. The graph provides a comparison between (a) the calculated "out of band" thermal radiation in the 7 to 8 μm range, and the 9 to 14 μm range from the microbolometer at different temperatures (shown on the X-axis) that is reflected onto itself (Narcissus effect) from the surface of the filter, with (b) radiation reaching the microbolometer from a scene at the designated temperature (Y-axis) using f/2 optics and passing through the 8 to 9 μm wavelength band pass filter. The graph shows that the Narcissus effect due to a microbolometer that is maintained at 30° C. is equivalent in terms of the incident radiation at the FPA to watching a target that is about 1,170K in temperature.

As a consequence, a microbolometer camera with a band pass filter positioned in front of the camera has a relatively large amount of parasitic radiation that is not useful for imaging. The parasitic radiation may be subtracted using an offset correction; however, the process may be only partially effective because of the introduction of radiation that degrades the image quality by limiting the dynamic range of the detector to avoid saturation. Additionally, for systems using multiple filters (such as in a filter wheel), the reflection from different filters can differ both in terms of intensity and spectral content. Therefore, a different offset is needed for each filter.

More specifically, patents representative of the background art, which are herein incorporated by reference in their entirety, include: U.S. Pat. No. 6,023,061 disclosing a camera having a two dimensional uncooled FPA, a compound lens for imaging IR radiation onto the FPA, and a means for adjusting the distance between the lens and the FPA to adjust focus; U.S. Pat. No. 6,853,452 disclosing a remote sensor for use as a handheld, mobile or stand-alone sensor that has first and second optical paths, light collecting optics, and a sample filter assembly positioned in a first optical path for passive, remote sensing of chemicals; and U.S. Pat. No. 6,515,285 disclosing methods and apparatus for compensating a radiation sensor for ambient temperature variations.

In addition, patent application publications representative of the background art, which are herein incorporated by reference in their entirety, include: US 2007/0176104 disclosing a process and system for a medium wave infrared (MWIR) uncooled microbolometer focal plane array (FPA) utilizing standard silicon processing techniques; US 2004/0223069 disclosing a tunable imaging sensor includes a housing with four lenses mounted on a front side; and US 2007/0120058 disclosing an uncooled infrared sensor utilized for fire fighting, surveillance of a border or any desired area, and limb sounding.

Accordingly, there is a need for a multi-spectral imaging system and apparatus that provides expanded capabilities and additional advantages over conventional systems, such as improving image quality, and reducing and or minimizing parasitic and background radiation.

SUMMARY OF THE INVENTION

In accordance with the invention the problem of background flux in the foregoing environment is solved by equipping an uncooled thermal IR camera with (i) filters tilted at an angle less than ninety degrees to the optical axis of the image detector of the camera (off the normal to the optical axis) so that radiation emitted from a warm detector is not reflected by the filter back into the detector, (ii) a filter housing that is cooled so that the radiation emitted by the housing and reflected off of the filter and into the detector is not from a warm surface, and (iii) filters that are cooled to reduce thermal emission from the filters themselves.

A multi-spectral camera system in accordance with a further aspect of the invention includes a cooled housing that shields the filters in front of a warm (un-cooled) thermal imaging detector (e.g., a microbolometer camera), in which the filters are inclined at an angle (e.g., θ) less than 90 degrees to the optical axis of the detector, suitably about 45 degrees. The cooled housing also serves as a cold shield or radiation shield, with a thermal radiation absorbing surface facing the filter to absorb any stray radiation. The cooled housing is reflective on the side facing away from the filters so that it reflects and rejects radiation arriving from outer sources. The cooled housing is in turn housed in a larger uncooled enclosure that serves as a vacuum enclosure. The vacuum inside the outer enclosure reduces the heat transfer by convection and conduction between the cooled housing and the outer housing.

The reflective surface of the inner cooled housing reduces the heat transfer by radiation. Collection of infrared imagery at multiple spectral bands with superior quality is obtained by reducing parasitic radiation incident on the imaging detector. Cooling the filters reduces the inherent thermal emission of the filters; and placing the filters at an angle in a cold housing eliminates parasitic retro radiation caused by the back reflection off of the warm (e.g., uncooled) detector.

The foregoing and additional objects and advantages of the invention, together with the structure characteristic thereof, which were only briefly summarized in the foregoing passages, will become more apparent to those skilled in the art upon reading the detailed description of a preferred embodiment of the invention, which follows in this specification, taken together with the illustrations thereof presented in the accompanying drawings.

DESCRIPTION OF THE PREFERRED EMBODIMENTS

In one salient feature of the present invention, an uncooled infrared camera system described herein below produces images of a scene or object in the thermal infrared region. The uncooled infrared camera uses a lens to capture and focus the thermal infrared radiation emitted by the scene or the object. The focused radiation is converted from photons or electromagnetic wave to electrical signal via a "detector". The detector uses a "sensor" that works by a change in resistance, voltage, capacitance, or current when heated by infrared radiation. These changes are measured and compared to values at the reference condition of the sensor. In one embodiment, the sensor utilizes a matrix sensor array (e.g., 1024× 1024 "pixels") to produce an electronic image of the scene. The matrix sensor array, occupies a position at the focal plane of the lens (often called FPA—focal plane array, or alternatively an IRFPA—InfraRed FPA).

As part of an exemplary embodiment, a matrix sensor array described below is a microbolometer device, e.g., a vanadium oxide (VOx) resistive material. The present invention is not limited to use of a detector of a microbolometer type. In particular, the detector may equivalently be replaced by any uncooled infrared sensor (e.g., device or array) including, but not limited to, the following materials: amorphorous silicon materials, poly SiGe, ferroelectric barium strontium titanate (BST), and the like. The generic term "detector" is used herein to mean any type of infrared array that is used in uncooled thermal IR cameras.

Referring to FIG. 2-5, an uncooled camera 1 (behind the vacuum housing 3 for the cold filters 4, 9) is "looking" through two windows of a vacuum housing 3: an exit window 2 directly in front of the camera and an entrance window 7 located directly behind lens 6. The windows 2, 7 and lens 6 are coated for optimal transmission over the thermal infrared range so those components have minimal effect on the background radiation.

In this exemplary embodiment, the components of the system are designed so that the optical path passes through a cold spectrally selective filter. A filter wheel 8 in housing 3 contains several interchangeable spectrally selective filters (e.g., 4 and 9) mounted at spaced intervals about the circumference of the filter wheel 8. The filter wheel 8 is mounted to a shaft 16 and may be rotated about shaft 16 to position a desired one of the plurality of filters (e.g., 4 and 9) carried by the wheel 8 directly into the optical path at the rear of the lens 6. The filters 4, 9 are inclined, or tilted, at an angle off the normal (e.g., θ) to the optical axis 18 such that the radiation from the warm detector in uncooled camera 1 is not reflected back upon itself, but is shunted to the side. Instead the warm detector effectively "sees" a cold surface of the cooled housing 10 in the reflection off of the filter, which does not emit a significant level of thermal radiation. The cooled housing 10 is an inner housing located between the outer vacuum housing 3 and the filter wheel 8 that is enclosed inside the cooled housing 10.

In variant of this embodiment, the cooling of the filters 4, 9 and the other cold surfaces of the housing 3 is accomplished via conduction cooling using a dewar 13 that contains liquid nitrogen. Other techniques can also be used such as a Stirling cryo-cooler, a thermoelectric cooler or any other technique for reducing the temperature of devices sufficiently below ambient conditions.

Using the system of the present exemplary embodiment, thermal radiation in a scene is focused by a lens 6 through a window into a vacuum enclosure 3. The radiation passes through an aperture 5 in a cold enclosure 10 and then impinges on a cold filter 4. The filter 4 transmits a spectral slice of the radiation, which then passes through aperture 17, another window 2 and is finally detected by an uncooled camera 1. The cold filter 4 determines a signature, e.g., spectral content, of thermal radiation in a scene that reaches the uncooled camera 1. The cold filter 4 is at a sufficient angle from the perpendicular to the optical axis 18 in which parasitic radiation emitted by the warm detector in the uncooled camera 1 is reflected onto the inner wall of the cold enclosure 10 instead of back onto the uncooled camera 1. A lens 6 is designed to work in the thermal IR spectral range. In one variant of the present embodiment, to further improve performance, the radiation shield 10 has an opening that matches the position of the lens exit pupil (i.e., cold stop). This prevents further radiation from the lens mechanical structure from reaching the uncooled camera 1.

Continuing with this exemplary embodiment, the filter 4 is held in a cold filter wheel 8, which rotates on a shaft 16 allowing other filters, such as filter 9, to be substituted in place in the optical path. The filter wheel 8 is in thermal contact with the cold enclosure 10, which is thermally connected to a cold finger 11. The cold finger 11 is cryogenically cooled, which in turns cools the cold enclosure 10 and the filters 4 and 9. In the example shown in FIG. 2, the cold finger 11 is cooled using liquid Nitrogen (LN2) held in a pour-fill vessel or LN2 container 15, which in turn resides inside a dewar 13 that is connected to the vacuum enclosure 3 by a flange 12. The system is pumped out so that an insulating vacuum resides in between the warm enclosure 3 and the parts are cryogenically cooled, namely, filter 4, filter wheel 8, cold enclosure 10, cold finger 11, and LN2 container 15.

Figure 2:
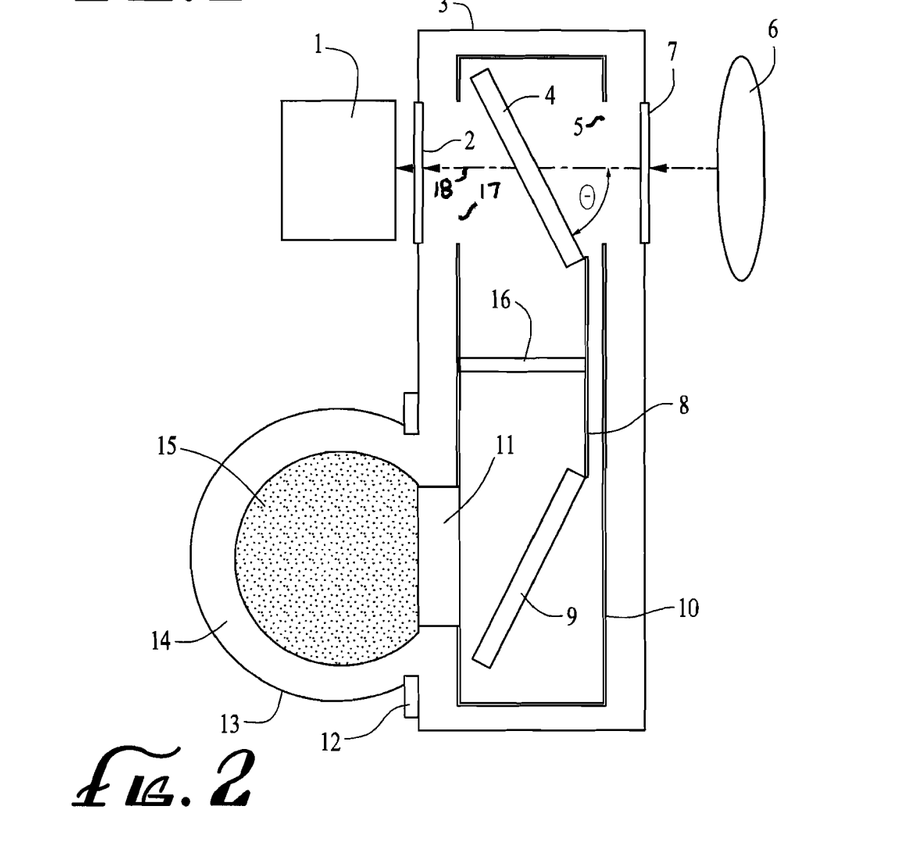
FIG. 2 is a schematic of a multispectral uncooled thermal infrared camera system in accordance with an embodiment of the present invention.
Figure 3:
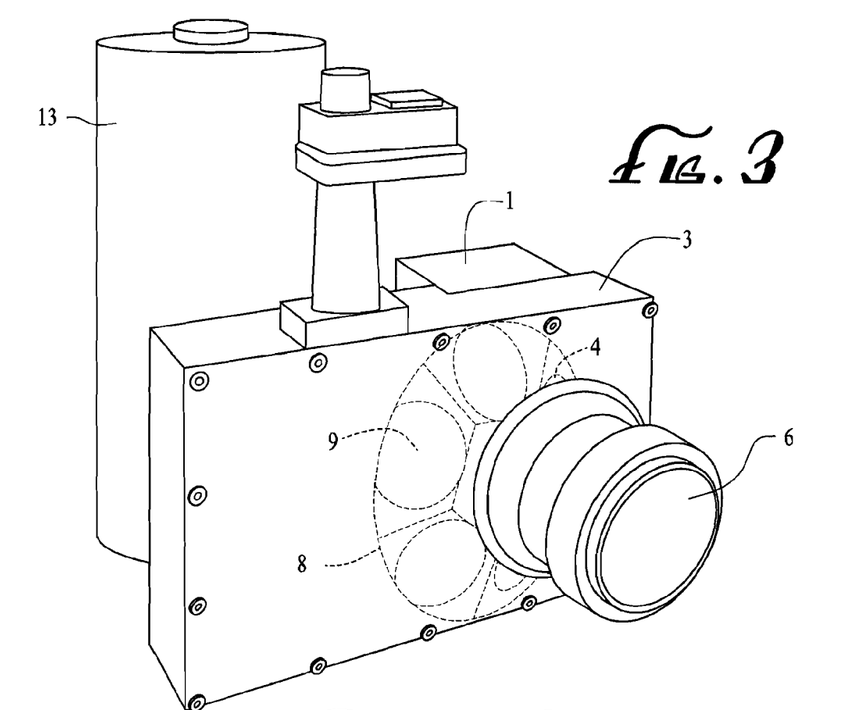
FIG. 3 is a front perspective view of a multispectral uncooled thermal infrared camera system of FIG. 2 depicting a cut-away view of the rotatable filter wheel in accordance with an embodiment of the present invention.
Figure 4:
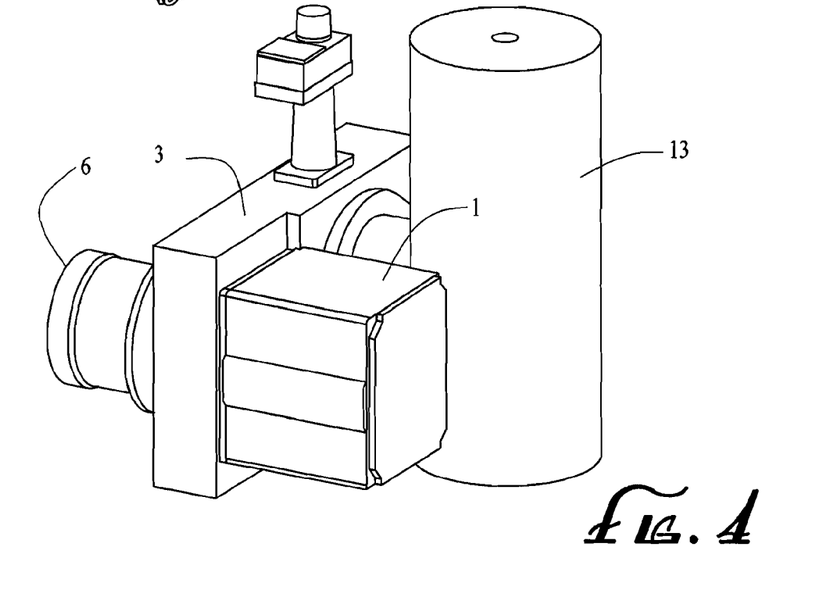
FIG. 4 is a side perspective view of a multispectral uncooled thermal infrared camera system of FIG. 3 to depict the uncooled camera and cooling liquid nitrogen (LN2) container in accordance with an embodiment of the present invention.

In one variant of this embodiment, the radiation shield 10 is preferably black on the inside (facing the filters) and reflective on the outside (facing the vacuum enclosure). The black interior absorbs the thermal radiation emitted by the uncooled camera 1 and reflected by the inclined filter (e.g., filters 4 and 9). The reflective outer side reflects thermal radiation emitted by the uncooled vacuum enclosure, and therefore reducing the thermal load on the cooling system (LN2 in this example).

Advantageously, the vacuum housing 3 (e.g. vacuum enclosure) of the present embodiment simplifies cooling of the optical filters 4, 9, the filter wheel 8, and the cooled housing 10. More specifically, if the cold surfaces were not enclosed inside an outer vacuum housing 3 the surfaces would be heated via conduction and convection through the intervening air. Moreover, if there is no vacuum housing, the cold surfaces, if cooled below the dew point, would suffer from condensation of water vapor in the atmosphere. To further maintain the filters 4, 9 at the lowest possible temperature and reduce the cooling power that is required, they are enclosed inside a "radiation shield," (10 in FIG. 2), that is an additional cold enclosure inside the vacuum enclosure 3. Consequently, the radiation shield 10 functions to block direct heating of the filters 4, 9 by radiation from the warm vacuum enclosure 3.

Figure 5:
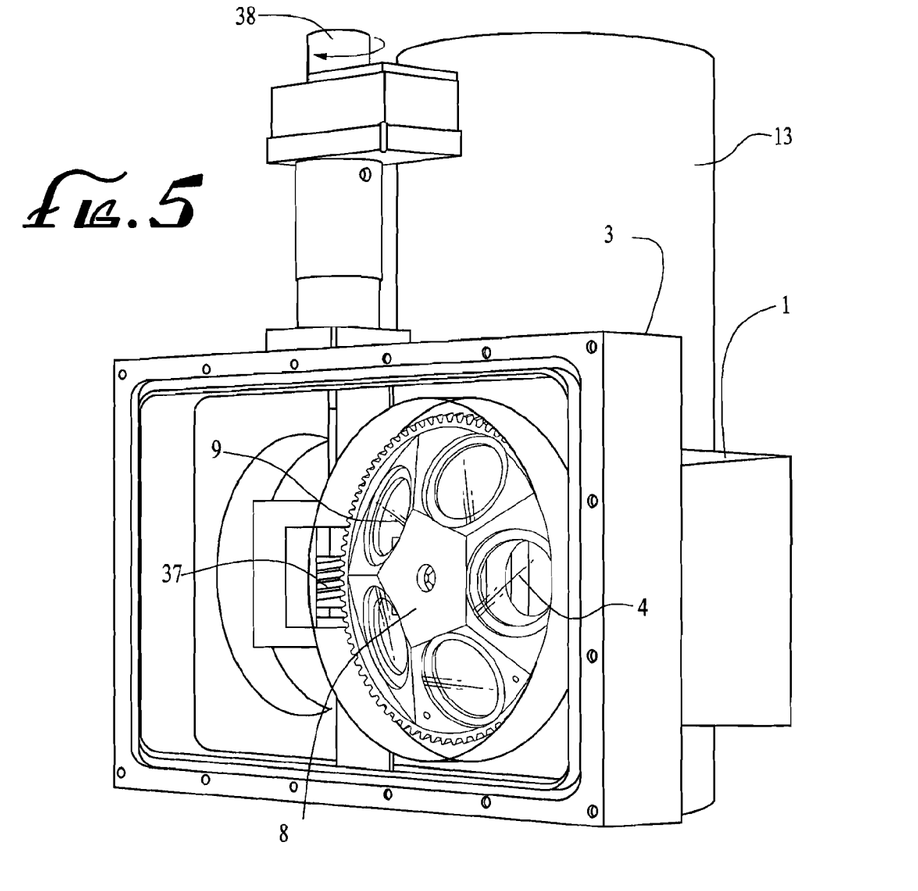
FIG. 5 is a front perspective view of a multispectral uncooled thermal infrared camera system of FIG. 3 to depict the tilted cold filters and the rotatable filter wheel in accordance with an embodiment of the present invention.

As best depicted in FIG. 5, the mechanism for rotating the filter wheel 8 is represented in this embodiment as a manual knob 38 and a gear 37. But those skilled in the art would realize that the filter wheel 8 can be rotated manually, electronically, via computer control, and in many other ways.

Figure 6:
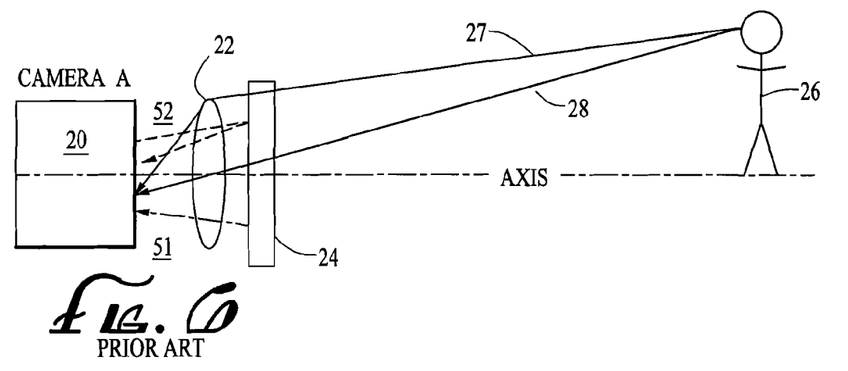
FIG. 6 is a diagram of a prior art uncooled camera system with a warm filter presented to aid in the understanding of the physics behind the advantageous characteristic of the present invention.
Figure 8:
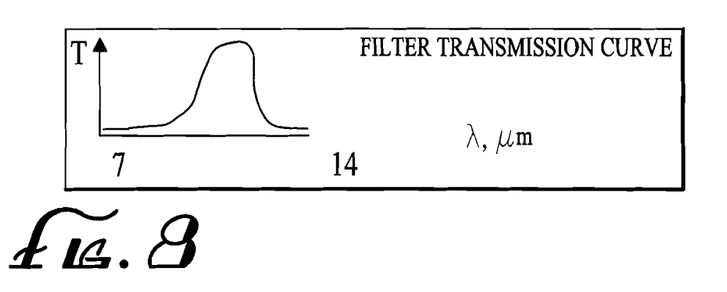
FIG. 8 is a diagram of the spectral transmission characteristic of the band-pass filter used in the system of FIG. 6.
Figure 9:
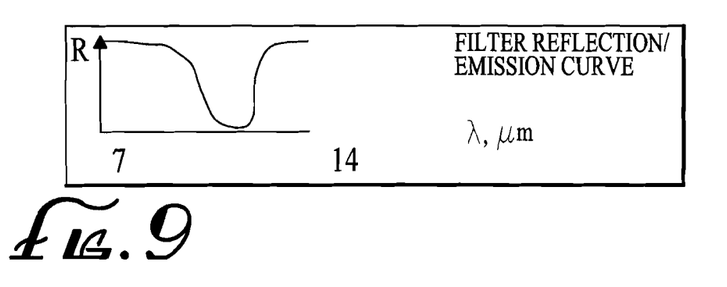
FIG. 9 is a diagram of the spectral reflection/emission characteristic of the filter having the transmission characteristic diagrammed in FIG. 8, showing the inverse relationship between the transmission and reflection/emission characteristics.

Referring to FIG. 6 (Camera A), a standard uncooled camera 20 is disclosed with a lens 22 and a warm (i.e., uncooled) bandpass filter 24 in front of the uncooled camera 20 that is receiving an image of an object 26. Filter 24 is aligned perpendicular to the optical axis (AXIS) of lens 22, and parallel to the detector array (not shown) in the uncooled camera 20. A conceptual transmission curve for the filter 24 is shown in the graph of FIG. 8 (transmission versus wavelength) and a conceptual reflection/absorption curve for the same filter is shown in FIG. 9. Thermal radiation from the object 26 that falls within the transmission curve of the filter 24 propagates to the uncooled camera 20 as is represented by lines 27 and 28. In a first case (Camera A) in which the system contains a warm filter 24, parasitic radiation emitted by the filter, shown by line 51 arrives at the uncooled camera 20 and degrades the image quality. In addition, radiation that is emitted by the uncooled camera 20, as shown by line 52, is incident on the backside of filter 24 and is reflected back to the uncooled camera 20 according to the reflection characteristic for the filter shown in FIG. 8. That reflected radiation also degrades the image quality. As those skilled in that art appreciate, filter 24 could also be positioned behind lens 22 in the combination and the combination of elements would function in the same way as described, although as a practical measure, the physical size of the filter could be reduced.

Figure 7:
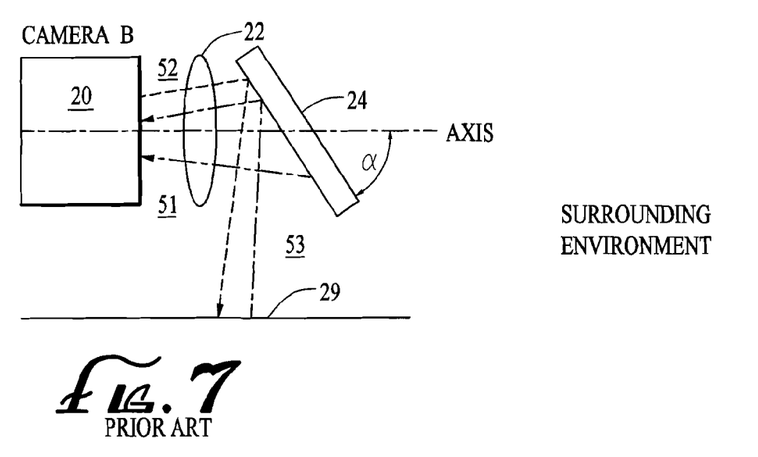
FIG. 7 is a diagram of an uncooled camera system with a tilted filter that obtains improved imaging as compared to the prior art system of FIG. 6 and is also presented to further aid in the understanding of the physics underlying the advantageous characteristic of the present invention.

Referring to FIG. 7 (Camera B), please note that the object 26 of FIG. 6 is understood to be present (but not repeated in FIG. 7 to emphasize selected features). In this example, a warm filter 24 is inclined at an angle, α, to the optical axis (AXIS), where α is significantly less than π/2 radians, the radiation 51 emitted from the filter 24 is still present to degrade the image quality at the uncooled camera 20. However, in this case the radiation 52 emitted by the uncooled camera 20, which is warm, is reflected into the surrounding ambient, instead of back to the input of the uncooled camera 20, substantially eliminating that radiation as a source of interference degrading received image quality. However, radiation 53 emitted by the surrounding ambient 29 is then reflected back into the uncooled camera 20 and degrades image quality.

Figure 10:
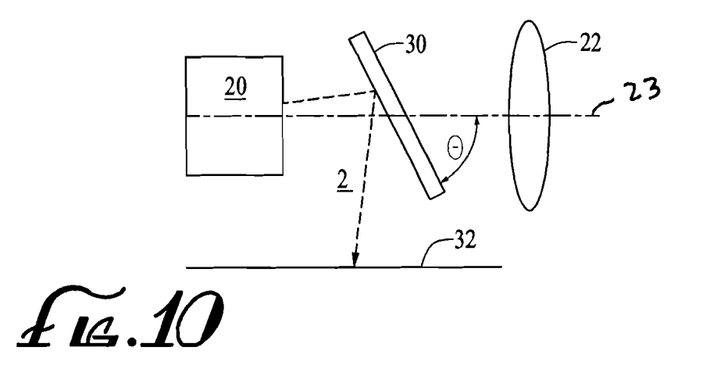
FIG. 10 is a diagram of an embodiment of the present invention earlier illustrated in greater detail in FIG. 2 that offers further reduction in parasitic radiation.

FIG. 10, to which reference is made, schematically represents the improved system of the invention that is best illustrated in FIGS. 2-5. In this system the surrounding ambient 29 is replaced (and bordered) by a cold shield 32, e.g., a radiation shield. For instance, the cold shield 32 is cold enclosure 10 in FIG. 2. By locating the filter behind lens 22 (lens 6 in FIG. 2) and directly in front of the uncooled camera 20 (1 in FIG. 2) and cooling the filter to produce a cold filter 30 (4 or 9 in FIG. 2), negligible or little radiation is emitted by the filter 30 (and none is illustrated), compared with the magnitude of radiation received by the uncooled camera 20 from the object or scene. Similarly, the radiation from the cold shield 32, which, would be reflected by the filter to create image degradation, is also negligible.

In addition, with the filter 30 at an angle to the optical axis 23, any radiation emitted from the uncooled camera 20 is reflected off to the surrounding cold shield 32 and is there absorbed. In hindsight, with the foregoing clarity of analysis, and simplicity of the schematic illustrations, the invention appears surprisingly simple in structure.

In one exemplary embodiment, the cooling medium selected is Liquid Nitrogen, which brings the temperature of the cooled filter down to about 80K (−193° C.). That medium is believed to offer the least expensive construction and does not require electrical power for the cooling. However, it is not necessary to cool the filter and radiation shield to liquid nitrogen temperatures. The amount of cooling required is that temperature that is low enough to render the thermal radiation off the filter and the surrounding housing low enough to enable the necessary sensitivity for imaging the scene observed. Without sufficient cooling the camera can saturate if the sensitivity is set too high. That cooling, determined through trial and error (or radiometric analysis), may be significantly less than provided by liquid nitrogen, say providing cooling only down to a temperature of 250K (−23° C.). One might consider an alternative embodiment of the invention in which thermo electric coolers are used to cool the filters to a temperature slightly below the ambient, as example, minus 23° Centigrade and determine whether the desired performance will be achieved.

As discussed above, the present invention allows the use of low cost, uncooled infrared imaging cameras (such as microbolometers) for single or multiple band pass, long-pass, short-pass, or notch imaging applications. The present invention also enhances the quality of images obtained in spectrally selective uncooled infrared imaging systems. Additionally, the present invention minimizes or eliminates parasitic and back radiation that occurs in infrared cameras when used with spectrally selective filters. Another advantage of the present invention is it minimizes or eliminates the Narcissus effect in infrared cameras when used with spectrally selective filters.

Furthermore, the present invention uses a lower cost uncooled detector and does not require a cooled type sensor (such as a quantum detector) that is much more expensive. In addition, the present invention may provide multispectral infrared imaging of high quality at a much lower price than similar quantum-type cameras, inducing a more widespread dissemination of the technology. Finally, the present invention provides multispectral infrared imaging that can be used for material differentiation and identification, and improved night scene understanding. For example the well known cross over in radiation during the diurnal cycle causes many objects of different materials to emit the same level of radiation (and thus be indistinguishable). But taking advantage of the spectral properties of different materials, the present invention helps resolve such essentially undetected objects in the scene.

It is believed that the foregoing description of the preferred embodiments of the invention is sufficient in detail to enable one skilled in the art to make and use the invention without undue experimentation. However, it is expressly understood that the detail of the elements comprising the embodiment presented for the foregoing purpose is not intended to limit the scope of the invention in any way, in as much as equivalents to those elements and other modifications thereof, all of which come within the scope of the invention, will become apparent to those skilled in the art upon reading this specification. Thus, the invention is to be broadly construed within the full scope of any claims that may be appended hereto.

What is claimed is:

1. An apparatus to analyze an object or a scene, comprising:
an uncooled housing having a first window and a second window to pass incoming infrared radiation from the object or the scene through the uncooled housing;
a lens placed in front of the first window to receive the incoming infrared radiation;
a cooled housing placed inside, and being thermally isolated from, the uncooled housing, the cooled housing being cooled below a temperature of the uncooled housing and having a first aperture and a second aperture positioned between the first and second windows of the uncooled housing;
a cooled filter disposed in a tilted position, inside the cooled housing and substantially centered about an optical axis defined by the lens to filter radiation directed between the first window and the second window, the cooled filter being cooled below the temperature of the uncooled housing; and
an uncooled infrared detector placed outside the uncooled housing and located behind the second window in the uncooled housing to receive a spectral range of the incoming infrared radiation from the scene through the lens and the cooled filter wherein the uncooled infrared detector is substantially centered about the optical axis defined by the lens;
wherein the tilted position of the cooled filter relative to the optical axis is selected to deflect parasitic radiation received at the cooled filter, including emitted thermal radiation by the uncooled infrared detector, away from and without returning back to, the uncooled infrared detector and to direct the deflected parasitic radiation to a cooled surface of the cooled housing to be absorbed; and
wherein the cooled housing and the cooled filter in the tilted position collectively minimize a level of parasitic radiation in the apparatus including emitted thermal radiation and thus improve detection by the uncooled infrared detector.

2. The apparatus of claim 1, wherein the uncooled infrared detector comprises a matrix sensor array and the first aperture disposed in the cooled housing comprises a lens stop.

3. The apparatus of claim 1, further comprising a cooled rotatable filter wheel operatively coupled to the cooled filter, the cooled rotatable filter wheel comprises several interchangeable cooled optical filters mounted at spaced apart intervals about a circumference of the cooled rotatable filter wheel; wherein the several tilted interchangeable cooled optical filters upon alignment with the windows each transmit a selected spectral range of the incoming infrared radiation.

4. The apparatus of claim 1, wherein the cooled housing comprises a radiation shield to minimize a level of the infrared radiation reflected from the uncooled housing to the uncooled infrared detector, and to absorb the infrared radiation emitted by the uncooled infrared detector and deflected by the cooled filter.

5. The apparatus of claim 3, wherein the cooled housing and the cooled rotatable filter wheel are coupled to a cold source to maintain their low temperature at the desired level.

6. The apparatus of claim 3, wherein an axis of rotation of the cooled rotatable filter wheel is mounted in the cooled housing and disposed substantially parallel to the optical axis.

7. A system to measure a multi-spectral, infrared signature from an object or a scene, comprising:
   an uncooled housing comprising:
   i.) a first window; and
   ii.) a second window;
   wherein the first window and the second window pass infrared radiation through the uncooled housing and the uncooled housing is free of direct thermal contact with a cooling device;
   a lens placed in front of the first window to receive incoming infrared radiation from the scene;
   a cooled housing placed inside, and being thermally isolated from, the uncooled housing, the cooled housing being cooled below a temperature of the funcooled housing and comprising:
   i.) a first aperture; and
   ii.) a second aperture;
   cooled filters that are located inside the cooled housing and cooled below the temperature of the uncooled housing, wherein the cooled filters have different transmission spectral bands to select, respectively, radiation in the different transmission spectral bands of the received incoming infrared radiation to transmit;
   a mechanism engaged to the cooled filter to adjust positions of the cooled filter to place, one filter at a time, in an optical axis that is formed by the lens and passes through the first and second windows of the uncooled housing and the first and second apertures the cooled housing, wherein each cooled filter when placed in the optical axis is disposed in a tilted position to reduce reflection by the cooled filter towards the second window; and
   an uncooled infrared focal plane array located outside the uncooled housing behind the second window to receive a spectral range of the incoming infrared radiation from the scene through the lens that is transmitted by a cooled filter that is placed by the mechanism in the optical axis that is formed by the lens and passes through the first and second windows of the uncooled housing and the first and second apertures of the cooled housing;
   wherein the first aperture and the second aperture are positioned between the first and second windows of the uncooled housing; and
   wherein the tilted position of each of the cooled filters relative to the optical axis is selected to deflect parasitic radiation, including thermal radiation omitted by the uncooled infrared focal plane array, to direct the deflected parasitic radiation to a cooled surface of the cooled housing to be absorbed and to reflect low level thermal radiation from the cooled housing into the uncooled infrared focal plane array.

8. The system of claim 7, wherein the first aperture disposed in the cooled housing comprises a lens stop.

9. The system of claim 7, wherein the mechanism engaged to the cooled filters includes a rotatable cooled filter wheel operatively coupled to the cooled filters.

10. The system of claim 9, wherein the cooled optical filters are mounted at spaced apart intervals about a circumference of the rotatable cooled filter wheel.

11. The system of claim 7, wherein the cooled housing comprises a radiation shield to minimize a level of reflected infrared radiation from the uncooled housing to the uncooled infrared focal plane array, and to absorb the infrared radiation emitted by the uncooled infrared focal plane array and deflected by a cooled filter that is placed.in the optical axis that is formed by the lens and passes through the first and second windows of the uncooled housing and the first and second apertures of the cooled housing.

12. The system of claim 7, wherein the cooled housing and the rotatable cooled filter wheel are coupled to a cold source to maintain their low temperature at the desired level.

13. The system of claim 7, wherein an axis of rotation of the rotatable cooled filter wheel is mounted in a radiation shield and disposed substantially parallel to the optical axis.

14. The system of claim 9, further comprising a cooling means to maintain the cooled rotatable filter wheel at a desired temperature.

15. The system of claim 9, wherein the tilted position comprises a value selected to minimize parasitic radiation received by the uncooled infrared focal plane array.

* * * * *

UNITED STATES PATENT AND TRADEMARK OFFICE
CERTIFICATE OF CORRECTION

| | |
|---|---|
| PATENT NO. | : 8,466,964 B2 |
| APPLICATION NO. | : 12/060881 |
| DATED | : June 18, 2013 |
| INVENTOR(S) | : Nahum Gat et al. |

It is certified that error appears in the above-identified patent and that said Letters Patent is hereby corrected as shown below:

In the Specifications

In Column 4, Line 43, please delete "DESCRIPTION" and insert
-- DETAILED DESCRIPTION --, therefor.

In Column 6, Line 50, please delete "line 51" and insert -- line 51, --, therefor.

In the Claims

In Column 9, Line 28, in Claim 7, please delete "funcooled" and insert
-- uncooled --, therefor.

In Column 10, Line 31, in Claim 11, please delete "placed.in" and insert
-- placed in --, therefor.

Signed and Sealed this
Twenty-eighth Day of January, 2014

Michelle K. Lee
*Deputy Director of the United States Patent and Trademark Office*